United States Patent
Pizzuto

(10) Patent No.: US 8,542,099 B2
(45) Date of Patent: Sep. 24, 2013

(54) SYSTEMS AND PROCESSES FOR TRACKING ITEMS

(76) Inventor: Thomas J. Pizzuto, Malvern, PA (US)

( * ) Notice: Subject to any disclaimer, the term of this patent is extended or adjusted under 35 U.S.C. 154(b) by 538 days.

(21) Appl. No.: 12/430,634

(22) Filed: Apr. 27, 2009

(65) Prior Publication Data

US 2009/0267740 A1  Oct. 29, 2009

Related U.S. Application Data

(60) Provisional application No. 61/048,025, filed on Apr. 25, 2008.

(51) Int. Cl.
*H04Q 5/22* (2006.01)
*G06F 17/00* (2006.01)
*B02B 1/00* (2006.01)
*A61B 5/00* (2006.01)

(52) U.S. Cl.
USPC ....... 340/10.1; 340/10.2; 340/10.3; 340/10.6; 235/375; 235/380; 235/462.07; 241/55; 241/79.1; 241/100; 241/606; 600/300

(58) Field of Classification Search
USPC ............... 235/375, 380–385, 462.07, 472.01, 235/462.25, 468, 487; 241/55, 56, 79.1, 241/99, 100, 101.2, 141, 606, 101.78, 280, 241/291, 294; 340/10.1–10.6; 345/166; 428/343; 600/300; 604/65; 705/2, 3
See application file for complete search history.

(56) References Cited

U.S. PATENT DOCUMENTS

| | | | |
|---|---|---|---|
| 5,886,634 A * | 3/1999 | Muhme | 340/572.1 |
| 6,763,997 B2 * | 7/2004 | Bennett et al. | 235/375 |
| 7,318,529 B2 * | 1/2008 | Mallett et al. | 209/702 |
| 7,336,183 B2 * | 2/2008 | Reddy et al. | 340/572.3 |
| 7,366,640 B2 * | 4/2008 | Smith et al. | 702/188 |
| 7,673,825 B2 * | 3/2010 | Jeansonne et al. | 241/100 |
| 7,801,742 B2 | 9/2010 | Silverbrook et al. | |
| 7,878,392 B2 * | 2/2011 | Mayers et al. | 235/375 |
| 7,905,401 B2 * | 3/2011 | Silverbrook et al. | 235/385 |
| 7,994,909 B2 * | 8/2011 | Maruca et al. | 340/539.1 |
| 2006/0122858 A1 * | 6/2006 | Miles et al. | 705/1 |
| 2008/0041996 A1 * | 2/2008 | Shaw et al. | 241/236 |
| 2008/0197194 A1 * | 8/2008 | Flood | 235/385 |
| 2008/0197972 A1 * | 8/2008 | Lawson et al. | 340/5.86 |
| 2008/0198021 A1 * | 8/2008 | Flood | 340/572.7 |

* cited by examiner

*Primary Examiner* — Daniel Wu
*Assistant Examiner* — Mancil LittleJohn, Jr.
(74) *Attorney, Agent, or Firm* — Pepper Hamilton LLP

(57) ABSTRACT

Systems and processes for tracking the status of an item are disclosed. Systems and processes for decommissioning identifying information from pharmaceutical product containers are disclosed.

21 Claims, 13 Drawing Sheets

SYSTEMS AND PROCESSES FOR TRACKING ITEMS

CROSS REFERENCE TO RELATED APPLICATIONS

This application claims priority to U.S. Provisional Application No. 61/048,025 filed Apr. 25, 2008, which is incorporated herein by reference.

FIELD OF THE INVENTION

The present invention relates to systems and processes for tracking items that have either been destroyed or which have been collected for destruction, and for processes and systems for decommissioning identifying information associated with items.

BACKGROUND OF THE INVENTION

In an era of increased concern over counterfeit and substandard products, theft and diversion, it is imperative that supply chains are secure. Mission-critical industries such as the pharmaceutical industry are being pressed into action to develop strategies and implementation plans to ensure compliance and uninterrupted supply.

One leading-edge solution that has figured prominently in anti-counterfeiting legislation is the application of randomly generated serial numbers at the lowest unit of sale (a.k.a. item-level serialization). Item-level serialization will co-exit with non-serialized information such as that contained within a universal product code (UPC). There are currently two prevailing methods of conveying serialized and non-serialized information: optically, or line-of-sight such as linear or two-dimensional barcodes and sightless technologies such as radio frequency identification (RFID).

In addition, the counterfeit drug problem has highlighted the importance of proper disposal of spent packaging materials. In the case of pharmaceuticals, where more than 3.8 billion prescriptions were filled in 2007 and valued in excess of $286 billion, branded and generic pharmaceutical manufacturers distributed more than 2.2 billion HDPE bottles. Most often, prescription drugs are sold to wholesalers and pharmacies in bulk quantities and are dispensed to patients in smaller, prescribed quantities. These bulk bottles are often tossed in the trash. For the enterprising counterfeiter, "dumpster diving" can yield a treasure trove of authentic bottles and labels that could be refilled with fake product and introduced back into the supply chain. Such practice has been proven to be the case in several counterfeit drug investigations conducted by the Food & Drug Administration's Office of Criminal Investigation (OCI).

This invention combines reading of data carriers to record serialized and non-serialized information, storing that information to a database and activating the destruction, or otherwise rendering of the of sensitive packaging materials unusable. Additionally, as in the case of highly regulated industries such as pharmaceuticals, the invention will take special care in its design; device installation and system integration to ensure the complete invention and the data it generates is compliant with various regulations including Title 21 CFR Part 11. Providing high quality data integrity will allow manufacturers of highly regulated products as in the case of pharmaceuticals to incorporate the data into their validated systems of record.

SUMMARY OF THE INVENTION

The invention relates to systems for tracking the status of an item. The system comprises a portal for receiving an item; an interrogation zone comprising one or more readers for obtaining identification information from a data carrier affixed to the item; a controlled access receptacle and/or one or more destruction devices; a transporter for delivering said item from the interrogation zone to the controlled access receptacle and/or one or more destruction devices; and a controller operatively coupled to the interrogation zone and to the transporter.

In some embodiments, the controller may be configured to receive identification information from the interrogation zone and record the status of the item after the item is advanced from the interrogation zone by the transporter. The advancement of the item may be detected by a sensor detects the item exiting the interrogation zone and/or a sensor detects that the transporter has operated to advance the item.

In some embodiments, the portal may be a control access portal which renders an item placed into it inaccessible until the item has advanced to the controlled access receptacle and/or one or more destruction devices.

In some embodiments, the system may comprise multiple portals.

In some embodiments, the portal may be configured to receive multiple items simultaneously.

In some embodiments, the system may accommodate items having multiple different shapes and/or dimensions.

The invention also relates to processes for tracking identification information from an item.

The invention further relates to systems and process for tracking identification information from items at numerous locations and components and devices used in such systems.

The invention further relates to systems and process for obtaining and storing identification information from items at a location using components and devices described herein.

The invention also related to processes for decommissioning identifying information associated with a pharmaceutical product container. The identifying information is logged in a database. The process comprises the steps of obtaining identifying information from a pharmaceutical product container that has been identified as having identifying information to be decommissioned, rendering the pharmaceutical product container unfit for use, and conveying the obtained identifying information to the database that contains the identifying information with information indicating that the pharmaceutical product container is bearing the identifying information is no longer in use. The database is updated to reflect that the identifying information is decommissioned.

DESCRIPTION OF PREFERRED EMBODIMENTS

Figure 1:
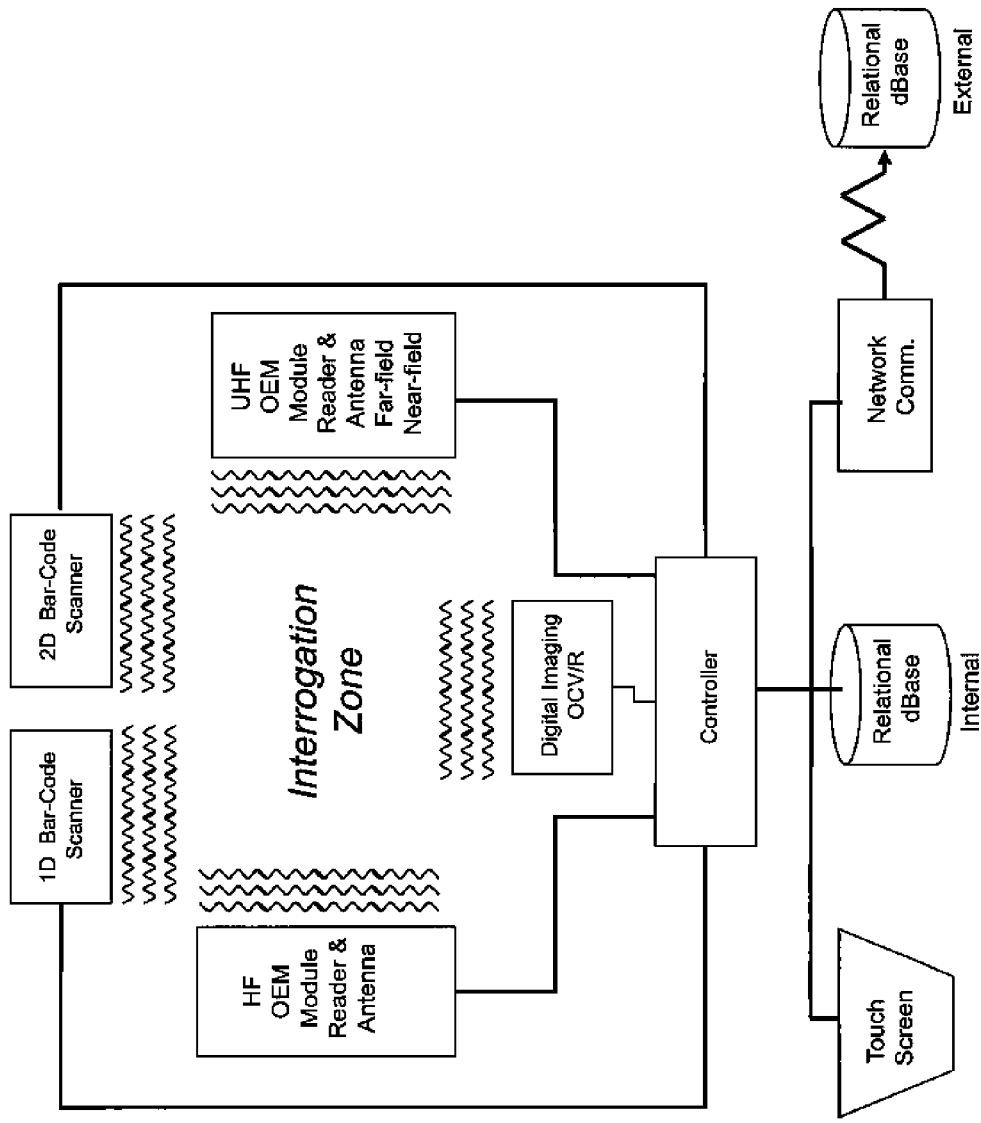
FIG. 1 shows an overview of an example of an auto-identification data capture sensors and computer system.

Aspects of the present invention provide for devices and processes which track items to be destroyed in a manner that can be validated. That is, devices and processes provide for the controlled custody of an item from detection and recordation of identification information on the item to destruction of the item. Validation, such as Computer Systems Validation, is confirmation by examination and objective evidence that a system satisfies the requirements of its users and the applicable regulatory agencies and will consistently perform according to its intended use. This applies to computer systems and software used to automate any part of the production process or any part of a quality system; system(s) that perform functions that could directly affect the identity, strength, quality, or purity of a product, such as for example a drug product, or the safety of individuals; systems used to create, modify, and maintain electronic records that are subject to regulatory review; systems that use electronic signatures as the equivalent of handwritten signatures; software used to automate testing, manufacturing, labeling, packaging, distribution, complaint handling, or any aspects of the quality system. The purpose is to ensure accuracy, reliability and consistent intended performance of the system, and its ability to discern invalid or altered records. Benefits of Validation include the increase of usability and reliability of the system, resulting in decreased failure rates and fewer corrective actions. Validation can reduce long-term costs by making it easier and less costly to reliably modify software and revalidate software changes and good software engineering practice. One example of Validation relates to the Regulations and Guidance Set forth in US Code of Federal Regulations—Title 21 Part 210—Current Good Manufacturing Practice in Manufacturing, Processing, Packing, or Holding of Drugs Part 211—Current Good Manufacturing Practice for Finished Pharmaceuticals Part 820—Quality System Regulation (Subchapter H—Medical Devices) Part 11—Electronic Records; Electronic Signatures General Principles of Software Validation; Final Guidance for Industry and FDA Staff Other Agencies: State agencies, European Union.

In some embodiments, the device used includes one or more components for carrying out the destruction. In some embodiments, following detection of identification information on the items, the items are transferred to a controlled access receptacle from which they are subsequently delivered to a device that destroys them. Some processes include detection of identification information and destruction of the item at the site of collection, some processes include detection of identification information of the item at the site of collection followed by transport of the item to the site of destruction, and some processes include transport of the item from the site of collection to site where the detection of identification information of items is detected and the item is destroyed.

While in some preferred embodiments, the item to be destroyed is a container, in some embodiments, the item to be destroyed may be identification information, a label or data carrier affixed to a container. That is, the tracking of an item's destruction is intended to provide a system in which an item's identifying information cannot be reused. Accordingly, the destruction that occurs subsequent to the identification data collection is intended to be destruction sufficient to prevent reuse of the identifying information to misidentify product as being the product for which the identifying information was originally used. Thus, while the complete destruction of a container that includes identifying information is one way to assure destruction of such identifying information so that it cannot be reused to misidentify a different product. Removal or destruction of the identifying information so that it can no longer be recognized as valid and detectable can prevent the reuse of containers which are supposed to include identification data. The tracking of identifying information in combination with item destruction allows for the final disposition of the item to be established and documented. One example of such type of destruction is decommissioning identifying information on certain types of data carriers. For example, certain radio frequency tags can be decommissioned so that they no longer indicate the identifying information or the identifying information is amended to reflect that the information is no longer valid. Using commands contained with a standardized air interface protocols, for example, a kill command can be initiated whereby the information on the radio frequency tag is rendered unreadable, designated as decommissioned or otherwise modified so that the container no longer contains valid, readable information. In addition to serialized and non-serialized information, scanners may also look for and, if present, read and record information contained in User Defined Memory. User Defined Memory is a free-form section on the tag that could record a variety of information and data, such as, for example, temperature information, lot number, expiration date, etc. Information/data found in User Defined Memory may be recorded at end-of-life together with the other information and data recorded when the tag is decommissioned and/or the item is destroyed.

In some embodiments, sensors may be provided which scan the tag after decommissioning or destruction of the tag to rescan the tag and confirm its decommissioning or destruction. In some embodiments, sensors may be provided prior to or in the destruction zone to confirm that tags intended to have been decommissioned have in fact been decommissioned or otherwise destroyed.

In some embodiments, the data that is collected may be included in centralized and/or distributed databases. Accordingly, some devices, systems and processes may include components and devices for the transfer and/or recordation of such data to a database as well as the storage component that contains such database.

In some embodiments, the item is selected from a charge card, a debit card, a check, a money order, a business document, a legal document, a financial document, a prototype, a product, a weapon, a biological material or sample, a pharmaceutical product, a pharmaceutical product container, pharmaceutical waste, a medical device or tool, an illegal material, and an illicit drug.

The identifying information may be stored on one or more data carriers. In some embodiments, the identifying information is included on machine-readable data carriers selected from a mag stripe, a smart card, a label, an embossing, a radio frequency identification tag, a linear bar code, a two-dimensional bar code, and the like, or machine readable code or human-readable code, and the like including machine readable code or human-readable code etched or printed on a label. In some embodiments, information includes lot number and/or expiration date. In some embodiments, identifying information may be encrypted. For example, a radio frequency identification tag may have encrypted information and components of devices which are provided to obtain identifying information may have the ability to read encrypted and unencrypted information on radio frequency identification tags.

In some embodiments, a device comprises one or more detectors for obtaining the identifying information on an item. Various types of detectors may be employed to detect identifying information on various types of data carriers. The detectors are located within an interrogation or detection zone of the device. In some embodiments, the device is readily upgradeable to comply with newly developed standards or protocols, or to incorporate a new release of an existing standard. In some embodiments, the device is able to accommodate any proprietary data carriers and/or encoding schemas.

In some embodiments, the device is arranged such that either the identifying information detected by the detectors is not initially recorded, or information indicating the destruction of an item bearing the identifying information is not recorded, until the item is removed from the interrogation zone and/or the data carrier is decommissioned. In some embodiments, the recordation of data is performed in a manner that prevents removal of the item from the interrogation zone by a route other than its transference to a destruction component or controlled access receptacle. That is, the system is preferably designed to prevent recordation of information that indicates an item has been destroyed in instances in which the item is removed without advancing toward the destruction components or to a controlled access receptacle. Such an arrangement provides a system for assuring that the items indicated to be destroyed have been destroyed, thereby reducing the likelihood misuse of the device by an operator and reuse of the item with its identifying information intact.

In some embodiments, the device comprises an interrogation zone which includes one or more detectors, one or more advancing components which transfers the item from interrogation zone to either one or more destruction components or a controlled access receptacle, and a controller which receives data from the detectors and, after the one or more advancing component transfers the item from interrogation zone to either a destruction component or controlled access receptacle, either records the data or records an indication that items containing such data has been destroyed.

In some embodiments, items are placed directly into interrogation zone of the device through a device portal, or the item enters the device through a device portal into an entry zone whereupon the item is then transferred into the interrogation zone by actively moving the item with a transporting component and/or passively moving it using gravity, the insertion of an additional item into the entry zone or combination thereof.

In some embodiments, the device portal is a controlled access portal. In some embodiments, the controlled access portal is maintained in a closed/no access position after an item is placed in it until the item is moved from the interrogation zone toward a destruction component or closed access receptacle by an advancing component, or when the item is transferred from an entry zone into the interrogation zone.

In some embodiments, the information from the one or more detectors is recorded by the controller upon the movement of the item from the interrogation zone toward a destruction component or closed access receptacle. The recordation may be initiated by detection of the removal of the item from the interrogation zone using a sensor in the interrogation zone or by detection of the advancing component attaining a position which indicates that an item has been removed.

In some embodiments, the destruction of the item occurs in the interrogation zone and the recordation of information occurs at the time of scanning and destruction.

In some embodiments, the information from the one or more detectors is recorded by the controller upon detection of the information and the information is subsequently updated to indicate the destruction of the item upon the movement of the item from the interrogation zone toward a destruction component or closed access receptacle. The recordation to indicate the destruction of the item may be initiated by detection of the removal of the item from the interrogation zone using a sensor in the interrogation zone or by detection of the advancing component attaining a position which indicates that an item has been removed.

In some embodiments, sensors shall also be located after the destruction zone to detect the presence of waste material or start/stop of waste stream, as evidence the item or material as, in fact, been destroyed.

These arrangements are preferably provided so that the destruction of the item can be correlated to its advancement in the system and thus, the system may facilitate confidence that the item indicated to be destroyed has been destroyed. In some embodiments, the device shall include a reject area in event the item or material cannot be scanned either because the data carrier(s) is absent or is damaged, defaced, or otherwise is unreadable. Such devices include either an alternative transport from the interrogation zone to the reject collection area. In some embodiments, the transport from the interrogation zone comprises a ram and the transport to the rejection area comprises alternative path of travel which is activated by the controller when an item is recognized as having a data carrier(s) that is absent, damaged, defaced, or otherwise unreadable. For example, a hinged trap may be opened such that as the ram pushes the item, the item falls through the trap and into the reject area. Various arrangements of components may be devised to sort the items following interrogation such that those which have readable data carriers may be advanced to the destruction zone or receptacle for collecting items to be destroyed, while those items missing data carriers or damaged, defaced, or otherwise is unreadable data carriers are advanced to the rejection area where they may, for example, be collected and manually processed.

As used herein, the terms "readers", "scanners" and "detectors" are used interchangeably and meant to refer to components, which can sense specific identification data presented from a data carrier. Examples of readers or detectors include those capable of detecting information from data carriers such as mag stripes, smart cards, labels, embossings, radio frequency identification tags, one dimensional bar code, two-dimensional bar codes, and the like. In some embodiments, the device has multiple readers or detectors so that it is functional for use with various data carriers. In some embodiments, at least one of the one or more readers is selected from a radio frequency identification reader, an optical recognition scanner, a MICR reader, a smart card reader, a digital scanner, and any other device capable of reading various linear and two dimensional symbologies. In some embodiments, the system comprises vision systems such as an optical character recognition or optical character verification scanners. Examples of such systems include machine vision modules which include scanning devices and system software. These and others are commercially available from a number of companies including Cognex (http://www.cognex.com); Sick, Inc. (http://www.sickusa.com); and National Instruments (http://ni.com/) In some embodiments, the system comprises a radio frequency identification antenna and reader capable of interrogating, reading and commanding RFID tags whose frequency ranges from 128 KHz to 2.4 GHz. RFID HF and UHF OEM modules can be purchased off-the-shelf from a number of companies including Skyetek (http://www.skyetek.com/); Feig (Germany): http://www.feig.de/; Kenetics (Singapore): http://www.kenetics-group.com/; and, Thingmagic: http://www.thingmagic.com/. Fixed mounted, linear and two-dimensional barcode modules can also be purchased off-the-shelf from a number of companies including Motorola/Symbol Technologies: http://www.motorola.com; Fametech, Inc. (TYSSO): http://www.barcode-manufacturer.com; and Accu-Sort Systems, Inc.: http://www.accusort.com.

As used herein, the terms "interrogation zone" and "detection zone" are used interchangeably and meant to refer to an area, usually a confined area, wherein one or more readers obtain identification information from a data carrier affixed to an item. In some embodiments, the interrogation zone further comprises a plurality of rollers affixed to a plate, hinged and spring-loaded at one end, which allows the one or more readers to obtain the identification information from the data carrier affixed to the item. In some embodiments, the interrogation zone includes components, which will physically move the item within the interrogation zone to permit recognition of the data carrier by the reader. For example, when scanning a container, the container may need to be moved into several different positions to ensure that the data carrier comes into sufficient proximity to a reader to acquire the identification data.

As used herein, "device portal" refers to an opening in the device that permits introduction of an item into either an entry zone or the interrogation zone. In some embodiments, the device portal provides access to a chute, conveyor access point, or an area where the item can be placed either in the interrogation zone or for transport to the interrogation zone.

As used herein, "controlled access portal" refers to a device portal, which includes a component or components that can be positioned to prevent access to the entry zone or the interrogation zone when in a closed position. In some embodiments, the controlled access portal is a door, such as a hatch, a grate, or a hinged, roll-up or sliding door, which can be secured such that it is prevented from being opened. In some embodiments, the controlled access portal is a revolving door, carousel or pivoting pass through, which can be secured such that it is prevented from being opened.

In some embodiments, when the controlled access portal is open, i.e. not in the closed position, the operator may place one or multiple items of various sizes and shapes into the secured scanning and destruction device. In some embodiments, operation of the scanning and/or destruction components of the device is prevented whenever the controlled access portal is not in the closed position. In some embodiments, electrical current will only flow to the scanning and/or destruction components of the device when the controlled access portal is in the closed position. In some embodiments, if during operation of the scanning and/or destruction components of the device the controlled access portal is no longer in the closed position, the device will immediately shut down.

In some embodiments, the means for removing the item from said interrogation zone and delivering it to the one or more destruction components or controlled access receptacle is selected from a ram, a hatch, a chute, a mechanical claw, a movable conveyor surface, a turn-table, directionally controlled air or water, electrostatic charge, a plurality of rollers, a rotating drum, a vibratory mechanism, or and the like, and combinations thereof.

In some embodiments, the device comprises one or more destruction components. In some embodiments, the destruction component renders the item unusable. In some embodiments, the destruction component renders a pharmaceutical container unusable, i.e. unfit for use. In some embodiments, the destruction component renders the item unusable by decommissioning the data carrier and/or the data contained therein. That is, the item is considered destroyed by the decommissioning the data carrier and/or the data contained therein regardless of whether or not any further physical changes are made to the item. In some embodiments, at least one of said one or more destruction components is selected from an incinerator, a shredder, a cutter, a crusher, a grinder, a chemical bath, a scoring tool, a laser, a pulverizer, a mulcher, gamma irradiator, a cutting wheel, and the like.

In some embodiments, the item delivered to the destruction component is appropriately containerized following its destruction. In some embodiments, appropriate environmental controls are employed to manage particulate matter such as dust, smoke, or atomized materials.

In some embodiments, the controller comprises a touch-screen human interface. In some embodiments, the controller comprises a user interface, which includes a switch for initiating the readers. In some embodiments, the controller comprises a user interface, which includes manual selection of the type of reader or readers to be employed. In some embodiments, all readers may be employed and recognition by the device of any identifying data is sufficient to complete a scanning cycle.

In some embodiments, the systems utilize networking methods known and readily available to those skilled in the art, such as for example, local area network (LAN), wide area network (WAN), wireless networks (WLAN or WWAN), and virtual private network (VPN). In further embodiments, the information transmitted from the interrogation zone to the controller is encrypted. In some embodiments, the information transmitted from the controller to the centralized database is encrypted. In further embodiments, the information transmitted from the interrogation zone to the controller is not encrypted. In some embodiments, the information transmitted from the controller to the centralized database is not encrypted.

In some embodiments, the device is a stand-alone, stationary object. In some embodiments, the device is easily transportable. In some embodiments, the device is configured to be truck-mountable for added mobility. In some embodiments, the device is permanently fixed to a dedicated material destruction facility or other facility where material destruction is desired or required. In some embodiments, the device is permanently fixed to a dedicated item destruction facility or other facility where item destruction is desired or required. In some embodiments, the device includes one or more destruction components. In some embodiments, the device does not include any destruction components but is mountable to or engaged with a controlled access receptacle which can received items after the data is identified and recorded.

In some embodiments, the present invention provides a process for tracking identification information associated with an item, comprising placing an item in a device, obtaining identification information from a data carrier affixed to the item, transmitting the identification information to a controller configured to receive and maintain the identification information, and destroying the item by decommissioning the data carrier or identification information thereon. In some embodiments, the present invention provides a process for tracking identification information associated with an item, comprising placing an item in a device, obtaining identification information from a data carrier affixed to the item, transmitting the identification information to a controller configured to receive and maintain the identification information, removing the item from the interrogation zone and delivering the item to a controlled access receptacle or one or more destruction components. In some embodiments, the process provides for the removal of items from the controlled access receptacle and destruction of such items. In some embodiments, the process provides for the removal of items from the controlled access receptacle and destruction of such items. In some embodiments, a record of destruction is created that could in the form of data, or data encoded on a magnetic strip, or data encoded on paper. In some embodiments, record of destruction could be documented in the form of paper receipts that in some case may be redeemable for cash or credit. In some embodiments, the device includes a component that can produce a receipt, which reflects that an item has been deposited in the device. Such embodiments for example may be useful when devices are deployed as collection sites for users who receive some form of credit, payment or the like. For example, end user consumers may be provided incentives in the form of cash, credit or coupons in exchange for relinquishing items. In such systems, the consumer may deposit an item in a tracking device which identifies and records the item as being collected, decommissioned or destroyed whereupon the consumer is provided with a receipt of such deposit entitling the consumer to some form of remuneration for example. In some embodiments, the process provides for the collection of items for destruction or decommissioning; compiling data from data carriers on items to be destroyed or decommissioned, destroying the item or otherwise destroying or decommissioning the data or data carriers, and communicating the compiled data and the destruction or decommissioning to a data recipient. Data may be compiled using readers or by visual inspection and data may be communicated electronically to the data recipient who may store the data.

In some embodiments, the identification information from the controller to a centralized database, either as encrypted or unencrypted data.

In some embodiments, parties who originate serial numbers are interested third parties. In some embodiments, pharmaceutical manufacturers are interested third parties. In some embodiments, pharmacies are interested third parties. In some embodiments, pharmacists are interested third parties. In some embodiments, distributors are interested third parties. In some embodiments, the government is an interested third party. In some embodiments, the consumer is the interested third party.

Some aspects of the invention refer to systems of collecting, tracking and destroying items. According to some embodiments, such systems include mobile collection vehicles which travel to locations where items have been collected. In some embodiments, the items are bulk containers for pharmaceutical products and the locations where items have been collected are pharmacies. In some embodiments, the items are collected in receptacles which have sensors that can determine when the receptacle is filled to known levels of its capacity. Such receptacles further comprise communication devices which can transmit to a receiving device, information related to the amount of items in the receptacle. For example, a receptacle may have a sensor that detects when it is filled to a certain level such as 80% capacity. When the sensor detects that the receptacle is filled to such level, it communicates that information to the receiving device. Communication may occur over a computer network such as an internet or intranet, or a telephone network such as a land based or wireless telephone system. Information transmitted may include the location of the receptacle or some location identifying information. The receiving device may be linked to a computer system which recognizes the location identifying information and in some embodiments may correlate such information with access hours etc. The receiving device and/or computer system may generate a list of locations which transmitted receptacles filled to determined levels. In some embodiments, the receiving device and/or computer system may generate a route, which includes a list of such locations in an order for pick up by the mobile collection vehicle. In some embodiments, the receiving device and/or computer system communicate the list of locations or the pick up route to a receiving device in the mobile collection vehicle, in the possession of the operator of such vehicle, or in the possession of an associate of such operator. Accordingly, collection of items in receptacles can be dispatched automatically or subject to regular pick up or at the direction for pickup by a receptacle user or dispatcher. In some embodiments, the mobile collection vehicle contains a devise for identifying and destroying items. In some embodiments, the mobile collection vehicle contains a devise for identifying and collecting items for destruction whereupon such items are delivered to a central destruction site for disposal. In some embodiments, the mobile collection vehicle collects and delivers items to a central site for identification and destruction of the items.

One aspect of the present invention relates to the processes for decommissioning identification information such as randomly generated serial numbers, which have been associated with pharmaceutical product containers prior to disposal or destruction of the container. Databases may be employed which lists identification information associated with pharmaceutical product containers that have been manufactured. The term "decommissioning" refers to indicating on such a database that a container, as identified by its specific identification information has been destroyed or otherwise rendered unusable, and that the specific identification information of the destroyed or otherwise unusable pharmaceutical product container is no longer in use.

The decommissioning processes comprise the steps of obtaining identification information from a pharmaceutical product container from a container, which has been selected for disposal or destruction and transmitting such data to a database that logs identification information associated with pharmaceutical product containers. Generally, the pharmaceutical product container is selected for disposal or destruction because it is empty, it contains product beyond its expiration date, it is a non-saleable return, there was an error during packaging of the product or when first "commissioning" the number in the database, or when a purchaser or distributor such as wholesaler who receives a case of product to which a serialized data carrier has been applied to the case and the case is opened so individual containers may be distributed requiring that the serial number on the case be decommissioned. Serial numbers maybe applied at any level of packaging: item, case, inner pack, pallet, etc. and decommissioning of such numbers is appropriate at the time point when the packaging is no longer associated with product for distribution.

The identification information associated with pharmaceutical product container can be obtained manually either by inspection or use of a hand held or other manually employed scanning or reading device. Alternatively, identification information associated with pharmaceutical product container can be obtained using an automated device which receives containers, scans or reads the identification information using components of the device, records the data and indicates the status of the container, which data may then be compiled and/or transmitted to a database.

The identification information associated with pharmaceutical product container is generally found on a data carrier as generally described herein. Data carriers preferably contain data which can be read using an electronic scanner or reader or visually by either a person or a machine.

Containers contain one or more different types of identification information. Such information may be on the same or different data carriers. Thus, in addition to identification information associated with pharmaceutical product containers, other data may also be obtained and transmitted with the identification information associated with pharmaceutical product container. Such information may optionally be Product Information, such as one or more of the following types of information: Legend Drug Name, Manufacturer, Product NDC, Strength, Dosage Form, and Container Size. Alternatively or in addition, such information may optionally be Item Information, such as one or more of the following types of information: Lot Number, Expiration Date, Quantity of Units by lot, Product Serial Number (if serialized), Universal Product Code (UPC) if present, Data Carrier Scanned (bar-code 1D, bar-code 2D, RFID HF, UHF (including UID (unique identifier) also called TID (tag identifier). Similarly, other information which may also be obtained and transmitted may include Transaction Information, such as one or more of Transaction Identifier (PO, Invoice) and Date, Transaction Type (sale, transfer, decommissioning, destruction) and Date, Unique Identifier for Pedigree transaction, and/or Trading Partner Information, such as Business Name, Address, license type and number, Operator Name and Time/Date.

The identification information associated with pharmaceutical product container and any other information which is obtained and transmitted may be used in a database to ascertain the final status of manufactured pharmaceutical product that was distributed bearing such identification information. The database tracking and compiling the information can record the product container identification information as decommissioned, thereby designating such numbers as no longer associated with legitimate product. In this way, such numbers cannot be reused in an effort to distribute counterfeit goods. Decommissioning renders such containers unfit for legitimate use.

In some preferred embodiments, the process includes the step of collecting containers which have been selected for disposal or destruction. In some embodiments, a collection device is provided into which containers may be deposited. In some embodiments, the collection device may be a device that comprises one or more reader scanners which can obtain identification information and optionally other information as discussed herein. In some embodiments, the collection device comprises one or more reader scanners which can obtain identification information, and transmitting equipment which can interface with a tracking database that compiles information. In some embodiments, the collection device comprises one or more reader scanners which can obtain identification information, and optionally other information as discussed herein, and destruction components which can destroy the container once the information has been obtained. In some embodiments, the collection device comprises one or more reader scanners which can obtain identification information, and optionally other information as discussed herein, and destruction components which can destroy the container once the information has been obtained, and transmitting equipment which can interface with a tracking database that compiles information.

In some embodiments, the collection device comprises sensors which detect how full the container is. Such sensors may detect that the container is near its capacity of containers to be destroyed, thus indicating that the collection device should be emptied, or, in the case of collection devices which contain destruction components, the sensors may indicate that the receptacle for collecting destroyed containers is nearing capacity and needs to be emptied. In either case, such containers may have an indicator which alerts a user that the container is approaching being filled to its capacity or it may have a communication device which communicates to a remote site that the container is approaching being filled to its capacity. In such instances, the remote site may be a central location linked to multiple containers whereby upon receiving information regarding the fill status of the plurality of containers, a pick up route is formulated for efficient routing of pick up of containers. In some embodiments, a vehicle is provided to pick up containers in collection device. In some such embodiments, the vehicle may include a device for scanning/reading to obtain the information and, optionally destroy the containers. In some such embodiments, the vehicle removes the collected containers to a central location where a device for scanning reading obtains the information from the containers which are then destroyed.

The ability to validate a process of decommissioning identification information associated with pharmaceutical products allows for the reliable collection of data with assurance that the status and data are accurate and true and that containers bearing decommissioned information have been destroyed or otherwise disposed of so that is no longer in condition for reuse.

Although the systems and processes herein relate to the pharmaceutical industry, it will be appreciated that the invention is not intended to be limited to that field of endeavor. The systems and processes are automated so that an operator may simply place one or more items into a secured scanning and destruction device and actuate the system. The system and processes automatically obtain identification information from an item and record and maintain said information for the benefit of interested third parties.

In some embodiments, the device may be used to collect information from containers such as for inventory or tracking transport. The device may receive pharmaceutical packages of varied shapes and sizes, scan data carriers on the packages including the data contained therein, log the data to a database, and eject the packages from the device without destroying the container for purposes of automating the logging of product.

The embodiments of the methods described above can be combined in any manner. Various modifications of the invention, in addition to those described herein, will be apparent to those skilled in the art from the foregoing description. Such modifications are also intended to fall within the scope of the appended claims. Each reference (including, but not limited to, journal articles, U.S. and non-U.S. patents, patent application publications, international patent application publications, gene bank accession numbers, and the like) cited in the present application is incorporated herein by reference in its entirety.

EXAMPLES

Example 1

A device may be provided which includes a control access portal that includes an opening for receiving the item and door which can be closed by the operator upon placing the item in the device. Upon closing the door, the operator engages a switch to initiate reading including identifying on the user interface of the device which readers to engage. A locking mechanism engages the door so that the door cannot be opened. The interrogation procedure is initiated whereby the item is moved within the interrogation zone by various rolling and tumbling components. Upon receiving data with the selected readers, the scanning cycle is completed the readers, rollers and tumblers are deactivated, the and the data is sent to the controller where it may be recorded together with date, user information, site location. Upon completion of the scanning cycle, a shredder is activated and a mechanical ram advancing component pushes the item from the interrogation zone into the shredder which destroys the item. When the mechanical ram fully extends, the controller records data to indicate that the item has been destroyed. When the mechanical ram returns to its former position, the controller activates a switch which unlocks the controlled access portal. The controller establishes a network connection with a centralized database at a remote location and transfers the data that indicates that the item has been destroyed to the centralized database.

Example 2

A device may be provided which includes a control access portal that includes an opening for receiving the item and door which can be closed by the operator upon placing the item in the device. Upon closing the door, the operator engages a switch to initiate reading including identifying on the user interface of the device which readers to engage. A locking mechanism engages the door so that the door cannot be opened. The interrogation procedure is initiated whereby identification from the data carrier is received. Upon receiving data, the scanning cycle is completed. The date carrier is then decommissioned and upon confirmation that the data carrier is decommissioned, the controller records data to indicate that the item has been destroyed. The item is transported to a bin for recycling and the locking mechanism on the door is released.

Example 3

A process may be provided in which a mobile collection unit retrieves items to be destroyed and delivers them to a centralized location for scanning and destruction. The items are removed from the truck and placed in a device according to the invention that includes an opening for receiving the item. As the items are placed into the device the items are transported to the interrogation zone where the identification data is acquired. When the controller receives the data, it initiates the advancing components to transfer the item to a pulverizing station. A sensor detects the removal of the item from the interrogation zone and the data is recorded.

Example 4

A device may be provided which includes a control access portal that is in the form of an opening having a turntable base with compartments that pivot in a manner similar to a revolving door. Items are inserted into a compartment and advanced as the compartments pivot and additional items may be inserted into compartments engaging with the access portal as the door revolves. As an item advances on the turntable base, it is removed from the compartment into an interrogation zone the interrogation procedure is initiated. The item may be moved within the interrogation zone by various rolling and tumbling components. Upon receiving data with the selected readers, the scanning cycle is completed the readers, rollers and tumblers are deactivated, and the data is sent to the controller where it may be recorded together with date, user information, site location. If the readers indicate that one or more data carriers are absent, damaged, defaced or otherwise unreadable, the item is advanced by a ram to chute that deposits the item in a reject area. Access to the chute is provided by unlatching a hinged trap door to the reject area by the controller. If the readers detect the identification information from the data carriers, the item is advanced by a ram to chute which deposits the item is a shredder which is activated and which destroys the item. If the readers detect the identification information from the data carriers, the controller records data to indicate that the item has been destroyed when the mechanical ram fully extends. The controller establishes a network connection with a centralized database at a remote location and transfers the data that indicates that the item has been destroyed to the centralized database.

Example 5

A device may be provided which includes an access portal that is in the form of an opening at the end of a chute. Items are placed in the chute and advance through the access portal to an interrogation zone. Upon entering the interrogation zone the item is moved within the interrogation zone by various rolling and tumbling components while readers scan the device for identifying information on one or more data carriers. Upon receiving data with the selected readers, the scanning cycle is completed the readers, rollers and tumblers are deactivated, and the data is sent to the controller where it may be recorded together with date, user information, site location. If the readers indicate that one or more data carriers are absent, damaged, defaced or otherwise unreadable, the item is advanced by a reject ram to a reject area. Access to the reject area may be provided through a hinged reject door which is opened by the controller or when the reject ram pushed the item into the reject door. If the readers detect the identification information from the data carriers, the item is advanced by a destruct ram to a destruct zone where the item is destroyed by a shredder which is activated by the controller. If the readers detect the identification information from the data carriers, the controller records data to indicate that the item has been destroyed when the destruct ram fully extends. The controller establishes a network connection with a centralized database at a remote location and transfers the data that indicates that the item has been destroyed to the centralized database.

Example 6

Items for destruction are collected in closed access receptacles which are transported to a central facility. The contents of the closed access receptacles are emptied into large containers or hoppers which are used to feed items into a device that comprises an interrogation zone. The items enter the interrogation zone through an access portal where the item may be moved within the interrogation zone by various rolling and tumbling components. Upon receiving data with the selected readers, the scanning cycle is completed the readers, rollers and tumblers are deactivated, and the data is sent to the controller where it may be recorded together with date, user information, site location. The item is removed from the interrogation zone and eventually deposited in either a reject area or a destruction zone. If the readers indicate that one or more data carriers are absent, damaged, defaced or otherwise unreadable, the item is conveyed to a reject area. If the readers detect the identification information from the data carriers, the controller records data to indicate that the item has been destroyed, and the item is advanced to a destruction area where it is destroyed. The controller establishes a network connection with a centralized database at a remote location and transfers the data that indicates that the item has been destroyed to the centralized database.

Example 7

A plurality of smart receptacles is deployed at locations where items for destruction are collected. A smart receptacle comprises a sensor which can detect when the receptacle is filled to defined level relative to its full capacity. When the receptacle is filled to such defined level, it activates a communication component transmits its status and identity or location by way of a modem over a computer network to a central dispatch computer. The central dispatch unit generates a pickup route for a vehicle operator who visits each location on the route and who transports the items to a central location where the items to be destroyed are processed.

Example 8

A plurality of closed access receptacles are deployed at locations where items for destruction are collected. A vehicle operator visits each location on the route and transports the items to a central location. The vehicle operator removes the closed access receptacle from the location and leaves an empty closed access receptacle at the location.

Example 9

A plurality of closed access receptacles are deployed at locations where items for destruction are collected. A vehicle operator visits each location on the route, removes the items from the receptacle and transports the items to a central location.

Example 10

A device may be deployed at a location where items for destruction may be collected. The device comprises a control access portal. An operator places the item in the control access portal which is then closed. The operator activates the interrogation procedure and the portal is locked. The item is scanned for identifying information on one or more data carriers. Upon receiving data with the selected readers, the scanning cycle is completed and the data is sent to the controller where it may be recorded together with date, and/or user information, and/or site location. If the readers indicate that one or more data carriers are absent, damaged, defaced or otherwise unreadable, the item rejected. When an item is rejected, the access portal is unlocked and the item ma be removed. A user interface indicates to the operator that the item has been rejected. If the readers detect the identification information from the data carriers, the item is advanced by a ram to either a destruction zone where the item is destroyed or a collection zone where the item is collected for destruction. The controller records the indentifying information and generates a receipt or proof of redemption on a recording medium, such as a printed receipt, which is provided to operator.

Example 11

Items manufactured for distribution are provided with serialized identifying information using one or more data carriers. Identification information corresponding to the items is recorded on a centralized database. When an item containing such identifying information is destroyed, a device is used which comprises an interrogation zone that comprises scanners which read the identifying information. A controller records that the item having the identifying information has been destroyed when the item is removed from the interrogation zone. The controller transmits to the centralized database the data that the item having the identifying information has been destroyed over a network communication system.

Example 12

Controlled access receptacles, equipped with photoelectric sensors installed in a retro-reflective arrangement, signal via cellular communication (or other means) when the receptacle's capacity has been met or is nearly met.

The communication packet contains date/time and location of receptacle.

The packet is automatically received into a computerized Route Planning application to determine optimal routing for pick-up.

Teams are dispatched to signaling locations per the computerize route map;

At each location, the receptacle is emptied of contents.

Contents are secured inside vehicle where they are transported to secure processing center where they are scanned, the data obtained is logged, and the contents destroyed using the system and process.

Scanned data is uploaded to a secure server where it available for download by clients.

Client records may reflect pick-up event details.

Example 13

Controlled access receptacles, equipped with photoelectric sensors installed in a retro-reflective arrangement, signal via cellular communication (or other means) when the receptacle's capacity has been met or is nearly met.

The communication packet contains date/time and location of receptacle.

This information is automatically received into a computerized Route Planning application to determine optimal routing for pick-up.

Receptacle is emptied of contents.

Contents are scanned, data logged and destroyed inside the vehicle using system and process.

Scanned data is uploaded to a secure server where it available for download by clients.

Client records may reflect pick-up event details.

Example 14

System/devices are deployed to various pharmaceutical dispensing locations including hospital and retail pharmacies.

Employees at these locations deposit serialized and non-serialized pharmaceutical containers into the system/device.

Scanned data is uploaded to a secure server where it available for download by clients.

The waste receptacle is equipped with photoelectric sensors installed in a retro-reflective arrangement, signal via cellular communication (or other means) when the waste bin's capacity has been met.

Commercial options: (a) pick-up of waste material initiated upon receipt of signal, or (b) client receives signal and makes alternative arrangement to handle waste material. In the case of (a), sensing and route planning as disclosed above will be applicable, whereas in the case of (b), this would not be applicable;

In either case, (a) or (b), the system/device records the waste bin alert event.

Example 15

System/devices are deployed to various pharmaceutical dispensing locations including retail pharmacies and in-store pharmacies.

Patients bring their original pharmaceutical manufacturer bottles to these locations and deposit serialized and non-serialized pharmaceutical containers into the device following set of visual instructions on the device explaining suitable containers.

The retail model device provides receipt for total items deposited, total items scanned and in one embodiment a receipt redeemable for cash or credit to future purchases.

Scanned data is uploaded to a secure server where it available for download by clients.

The waste bin is equipped with photoelectric sensors that signals via cellular communication (or other means) when the receptacle's capacity has been met;

Commercial options: (a) pick-up of waste material initiated upon receipt of signal, or (b) client receives signal and makes alternative arrangement to handle waste material. In the case of (a), sensing and route planning as disclosed above will be applicable, whereas in the case of (b), this would not be applicable;

In either case, (a) or (b), the system/device records the waste bin alert event.

Example 16

Vision System with Optical Character Verification (OCV) may be employed in some embodiments as sole or additional sensor.

Optical Character Recognition (OCR) is the mechanical or electronic translation of images of handwritten, typewritten or printed text (usually captured by a scanner) into machine-editable text. A database stores a plurality of digital codes and an object image data entry associated with each respective digital code of the plurality of digital codes. A processing unit generates at least one digital code; accesses at least one object image data entry associated with at least one respective stored digital code that substantially matches the respective at least one generated digital code; and compares the object image data with the at least one accessed object image data entry and determines if the comparison results are within a predetermined image recognition certainty threshold.

Photoelectric Sensor or photoeye refer to a device used to detect the presence of an object by using a light transmitter, often infrared, and a photoelectric receiver. There are three functional types. An opposed arrangement consists of a receiver located within the line-of-sight of the transmitter. In this mode, an object is detected when the light beam is blocked from getting to the receiver from the transmitter. A retro-reflective arrangement places the transmitter and receiver at the same location and uses a reflector to bounce the light beam back from the transmitter to the receiver. An object is sensed when the beam is interrupted and fails to reach the receiver. A proximity-sensing arrangement is one in which the transmitted radiation must reflect off of the object in order to reach the receiver. In this mode, an object is detected when the receiver sees the transmitted source rather than when it fails to see it.

ISD refers to an Integrated Scanning and Decommissioning device which can be a mobile or fixed mounted device In some embodiments, external readers, scanners, antennas via parallel, serial, ethernet, USB connections and the like can be added to or included within a device or system component.

RFID companies include
Skyetek (US): http://www.skyetek.com/
HF and UHF OEM modules
Feig (Germany): http://www.feig.de/
HF and UHF OEM modules
Kenetics (Singapore): http://www.kenetics-group.com/
HF and UHF OEM modules
Thingmagic: http://www.thingmagic.com/
UHF OEM modules
List of 1D and 2D bar code scanning companies:
Motorola/Symbol Technologies: http://www.motorola.com
Fametech, Inc. (TYSSO): http://www.barcode-manufacturer.com
Accu-Sort Systems, Inc.: http://www.accusort.com
Machine vision modules can be purchased off-the-shelf from a number of companies including:
Cognex (http://cognex.com);
Sick, Inc. (http://sickusa.com);
National Instruments (http://www.ni.com/).

Example 17

Package Systems Handling—HDPE bottles, variable sizes and shapes In some embodiments, the device will need to accommodate a wide range of HDPE bottles with sizes ranging from 15 cc to 1500 cc; closures ranging from 15 mm to 50 mm; and various shapes including round, square and rectangular. This wide variation presents considerable challenges, especially considering that present-day bottle packaging lines require numerous change parts and recalibration in order to accommodate different sized and shaped bottles.

To solve this challenge, one approach is to create specialized a specialized bottling handling implement that may be mounted on a supporting platform. This supporting platform can be motorized or free spinning. The platform shall be made parallel and affixed to a larger, primary or host platform that will rotate base in either the horizontal or vertical plane. This primary platform shall convey the supporting platform past one or more auto-identification interrogation zones.

Figure 6:
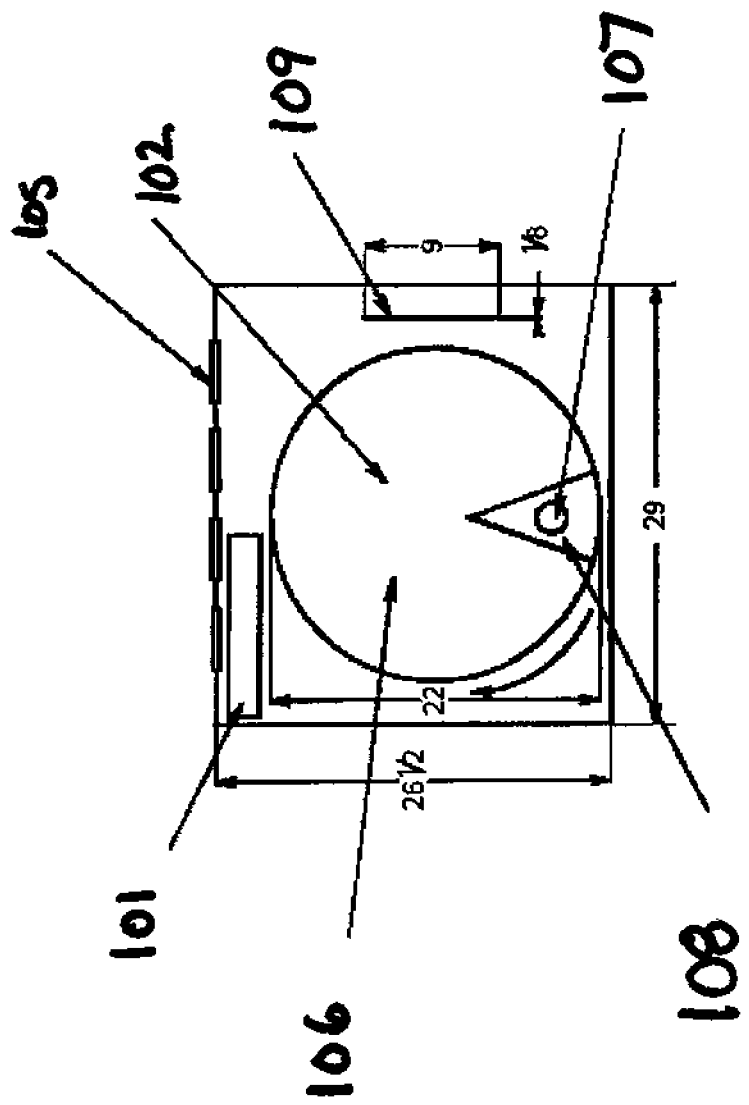
FIG. 6 shows a top view of an example of an item decommissioning and material destruction device.
Figure 7:
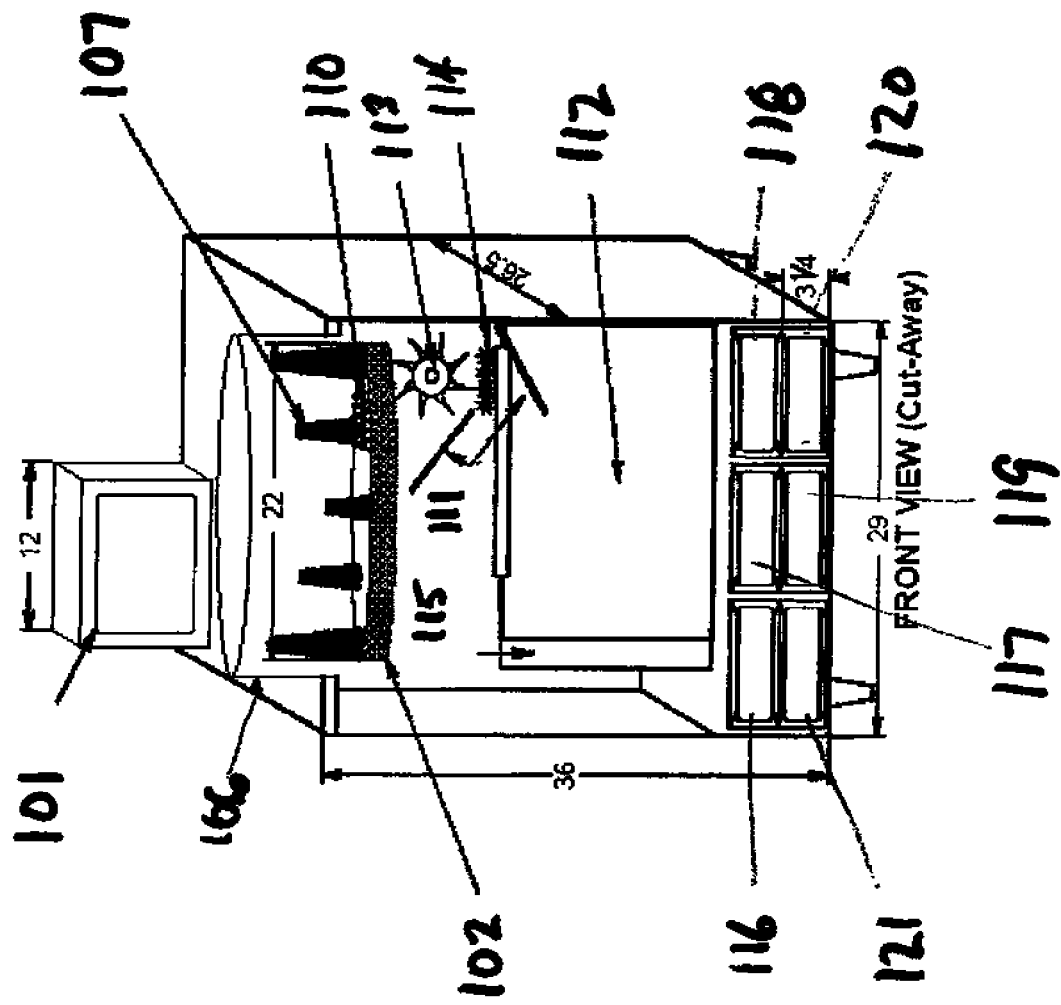
FIG. 7 shows a front view cut away of an example of an item decommissioning and material destruction device.

In the case of bottle handling, a coiled spring and around which plastic bristles are arrayed in a conical shape in order to accommodate closures of varying diameter (see FIG. 7). These "spindles" will be configured and affixed to the aforementioned supporting platform and will rotate as the base rotates. As the circular base rotates, it will pass multiple auto-id interrogation zones. A spindle shall complete not less than two 360-degree rotations within each auto-id interrogation zone to ensure at least two complete views of labels and any auto-id data carriers that may be present (see FIGS. 5 and 6). Once the spindle has passed by every interrogation zone, a rake, in combination with a spring-loaded arm will scrape the bottle from the spindle and gravity feed the bottle to the destruction device, which in this embodiment, will be a shredder.

Example 18

In some embodiments, centralized depot/reclamation center is employed. One or more vehicles pick up items for tracking. Items are moved from vehicles to large hoppers, conveyors, tracking systems including destruction devices.

Example 19

FIG. 1 is a diagram which shows an example of Auto-ID data capture sensors and system architecture. In this embodiment, the readers have the following specifications.

HF Device
Frequency: HF 13.56 MHz
Protocols: EPC HF v1, ISO 15693, I-CODE1, I-CODE-UID OTP
Range: 3 cm-16 cm (1"-6")
USB Connect: Yes
Int. Antenna: Yes
Ext. Antenna: Yes
Digital Imaging
High-speed intelligent cameras, full-scale machine vision system and Optical Character Recognition (OCR) and/or Optical Character Verification capability.
Bar-Code Device
Light Source: Visible laser diode 65 nm
Scan Rate: 640 scans/sec (nominal)
Scan Horizontal: Cyclone 34 deg; Raster 34 deg.
Scan Vertical: Cyclone 34 deg; Raster 12.5 deg.
Scan Patterns: Linear, smart raster and omni directional
Symbologies: PDF417, Micro PDF, UPC/EAN, Code 39, 12 of 5 Code 128, Codabar, MSI Plessey, RSS & Composite Code
USB Connect: Yes
UHF Device
Frequency: UHF 862-955 MHz
Protocols: EPC C1G1, EPC C1G2/ISO 18000-6C, ISO 18000-6A & B
Range: 3 cm-16 cm (1"-6")
USB Connect: Yes
Int. Antenna: No
Ext. Antenna: Yes
Remarks: Device may also include near-field UHF capability.

Example 20

Figure 2:
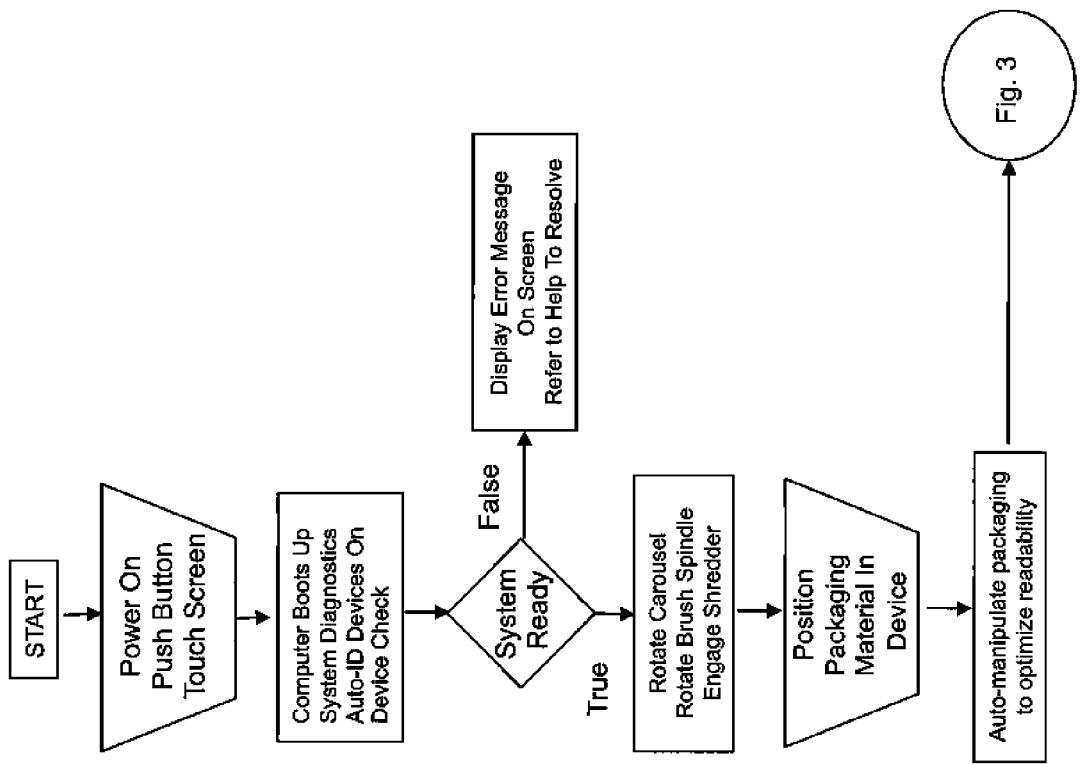
FIG. 2 shows order of start up operations for an example of the invention.
Figure 3:
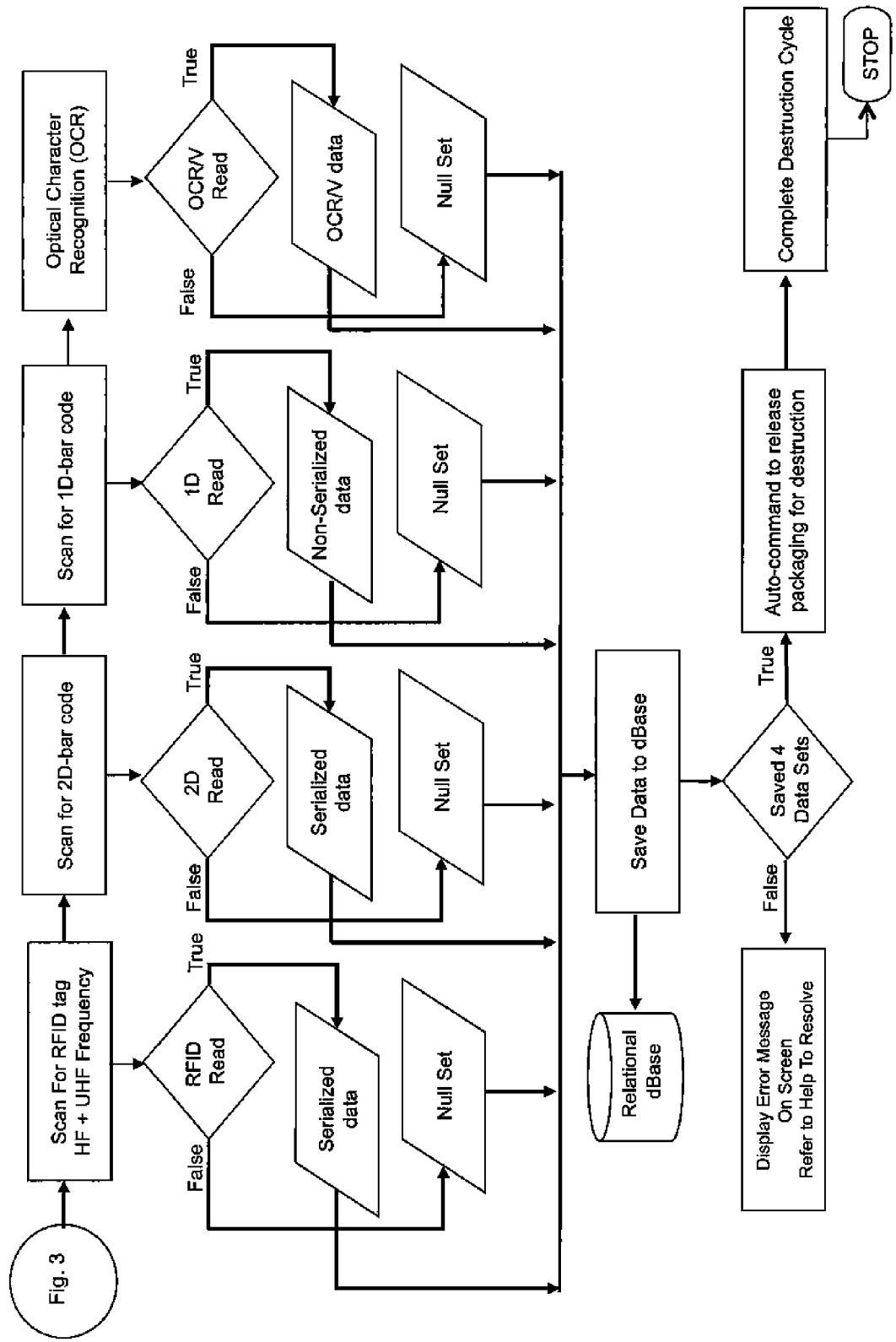
FIG. 3 shows order of operations for an example of the invention.

FIG. 2 is a flow diagram showing the order of start up operations for an example of the invention. Upon determining the that the system is ready and the package material receiving components are properly positioned and provided with package material, the package material is auto-manipulated for scanning. The order of scanning and data processing for this example of the invention is diagramed in FIG. 3.

Example 21

Figure 4:
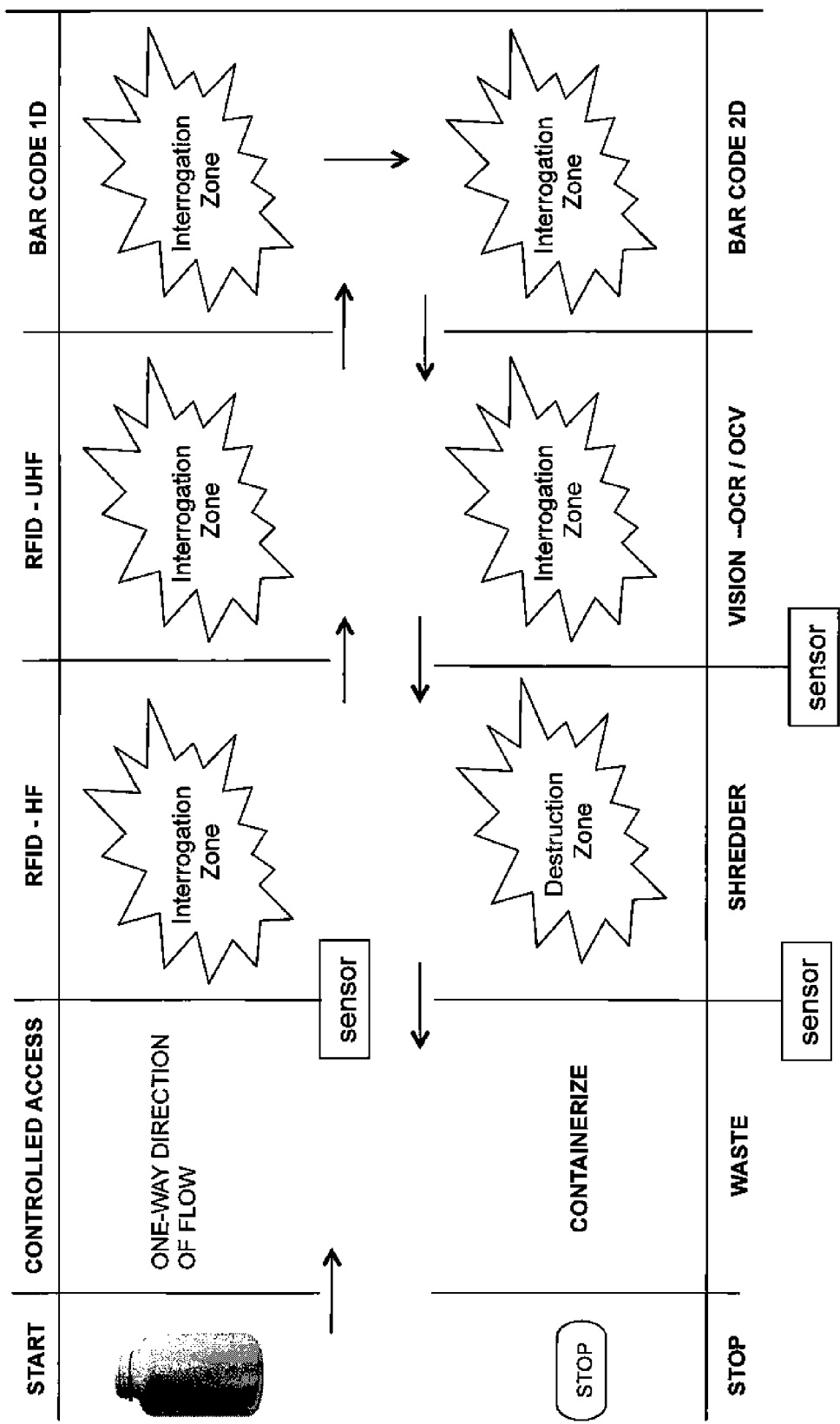
FIG. 4 shows sequence of events for an example of the invention.

The sequence of events for an example of the invention is depicting in the diagram in FIG. 4. Sensors of multiple different types are deployed after which the container is delivered to the destruction zone where it is shredded.

Example 22

Figure 5:
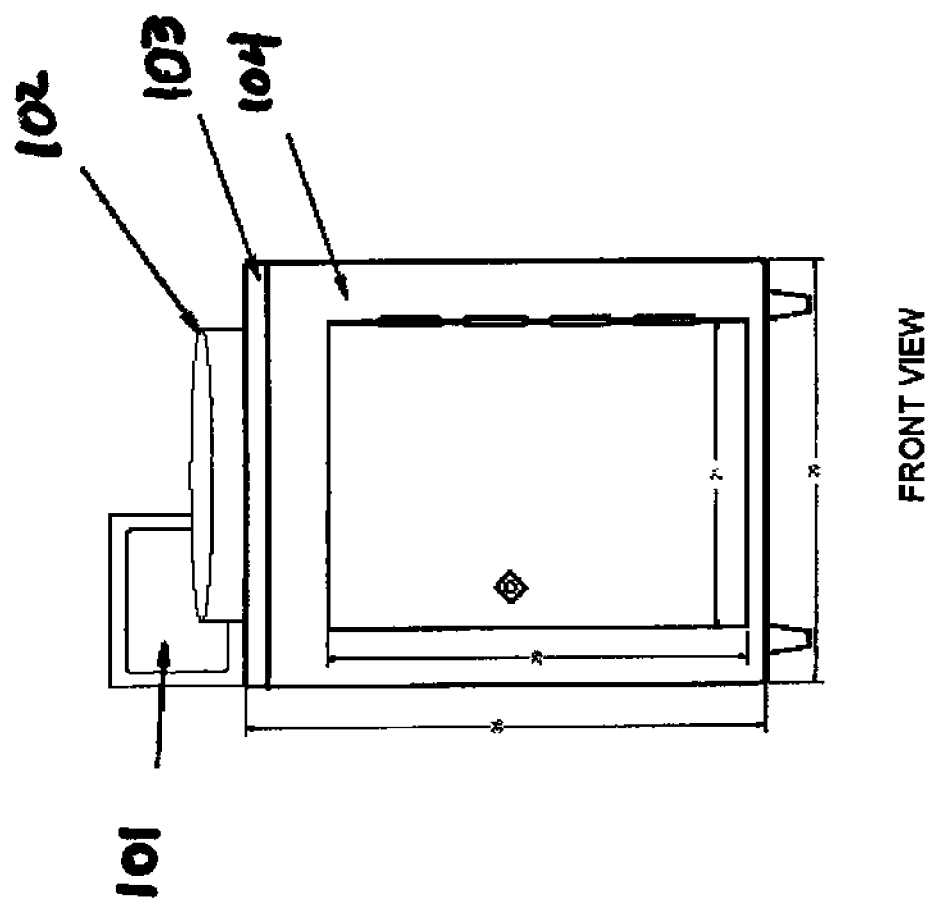
FIG. 5 shows a front view of an example of an item decommissioning and material destruction device.

FIGS. 5-7 shows various views of an example of an item decommissioning and material destruction device including dimensions. FIG. 5 shows a front view of this example of an item decommissioning and material destruction device. The control panel 101, which includes a touch screen, and the carousel 102 which is provided for receiving material to be decommissioned, are located on the top unit 103 of the device. The bottom unit 104 comprises other components of the device. FIG. 6 shows a top view of this example of an item decommissioning and material destruction device which contains the components of the top unit. A hinge attaches the top unit to the bottom unit and allows for the access for the bottom unit from the top position by lifting the top unit about the hinge 105 to expose the bottom unit. The top unit 103 as shown in FIG. 6 contains a control panel 101, which includes a touch screen, and the carousel 102 which is provided for receiving material to be decommissioned. The carousel 102 is covered by shroud 106 comprises one or more spindles 107 which can be accessed through a controlled access location 108. This embodiment additionally provides a slot 109 which can be used to introduce paper into a destruction device and/or receptacle in the bottom unit 104. FIG. 7 shows a front view cut away of this example of an item decommissioning and material destruction device. The top unit 103 comprises the control panel 101, which includes a touch screen, and a carousel 102 which comprises a plurality of bottle spindles 107 and a synchronized rake 110 and which is covered by a shroud 106. The bottom unit 104 comprises a chute 111 from the carousel 102 to waste receptacle 112 and a star wheel 13 and shredder 114 in the path of the chute 111. The waste receptacle comprises a HEPA filter 115. The device further comprises a plurality of readers 116, 117, 118, a controller 119, a wireless modem 120 and a power supply 121.

Example 23

Figure 8:
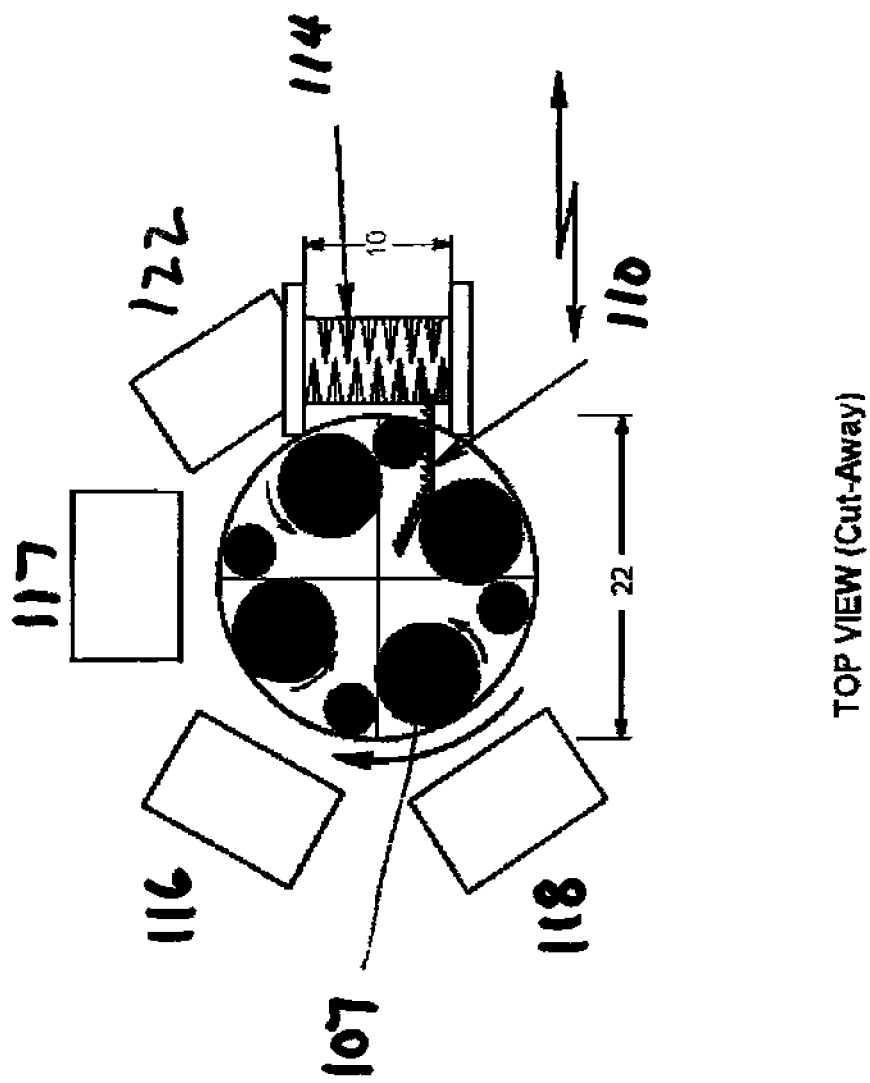
FIG. 8 shows a front view of an example of an item decommissioning and material destruction turntable and disc.

FIG. 8 shows an example of an item decommissioning and material destruction turntable and disc. The turntable comprises a plurality of spindles 107. The rotation of the turntable exposes containers on such spindles 107 to a plurality of readers 116, 117, 118, 122 which each form an interrogation zone comprising the space both immediately adjacent to and between the readers and turntable. A synchronized rake 110 causes containers to be transported to a shredder 114.

Example 24

Figure 9:
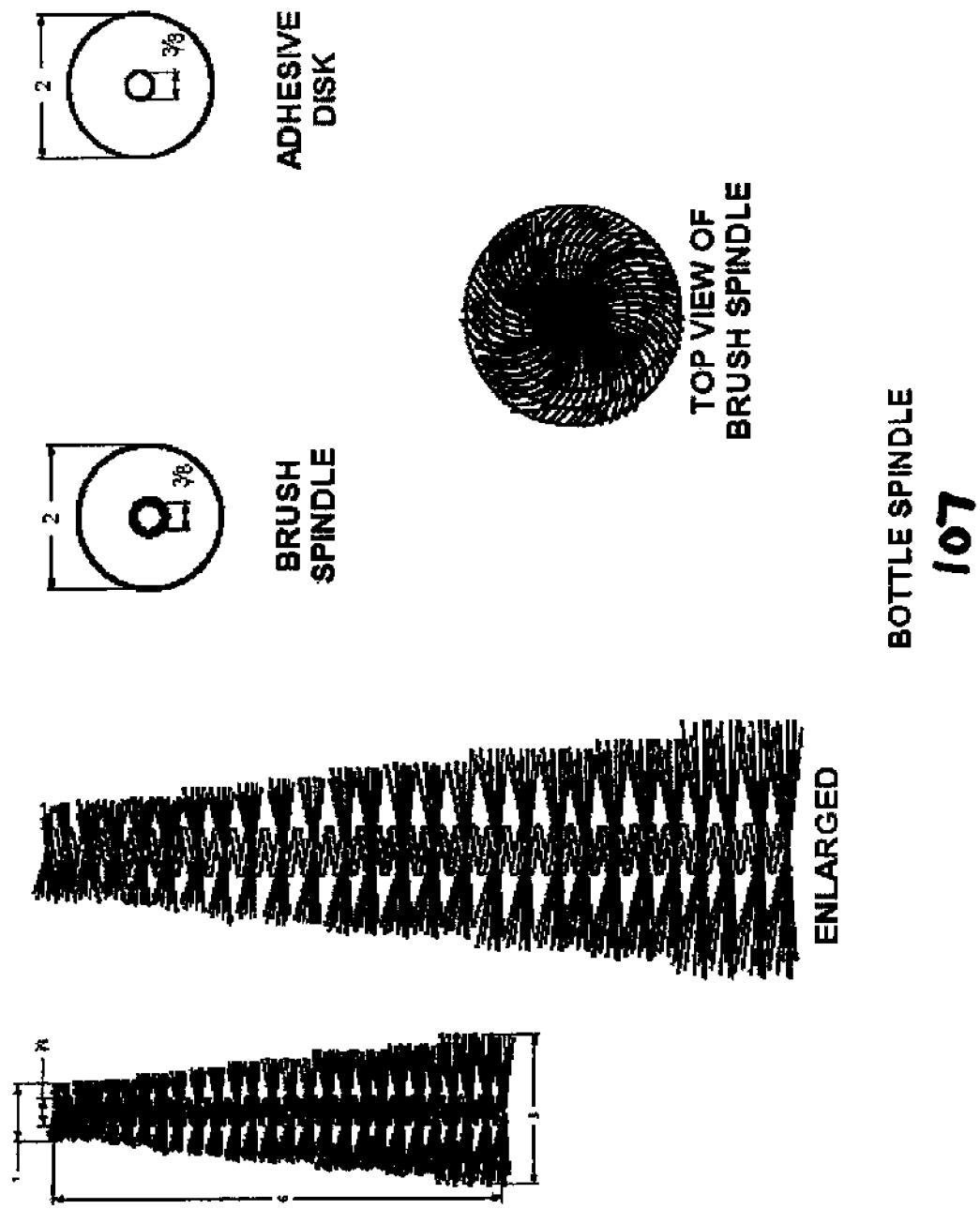
FIG. 9 shows examples of bottle handling implements.
Figure 10:
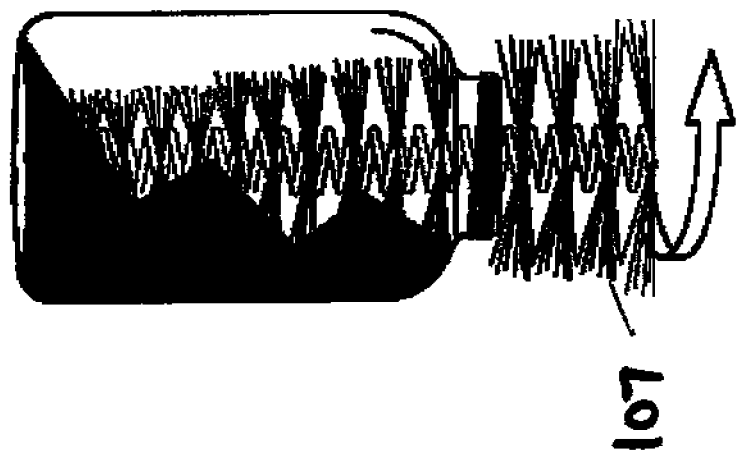
FIG. 10 shows an example of a bottle engaged with a bottle handling implement.
Figure 11:
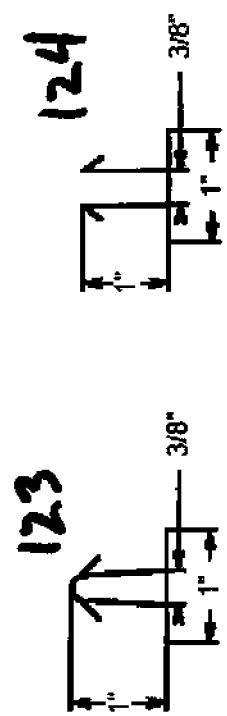
FIG. 11 shows examples of a package system handling attachment for vials.

FIGS. 9-11 show container handling implements and their engagement with containers to be processed. FIG. 9 shows different views and examples of spindle 107 bottle handling implements. An adhesive disc and/or brush spindle may be used to engage and holds bottles with and without closures. FIG. 10 shows an example of a bottle engaged with a spindle 107. The brush spindle may be used to engage and hold a plastic bottle without a closure. FIG. 11 shows examples of vial handling implement 123, 124 in which vials may be engaged with or without stoppers.

Example 25

Figure 12:
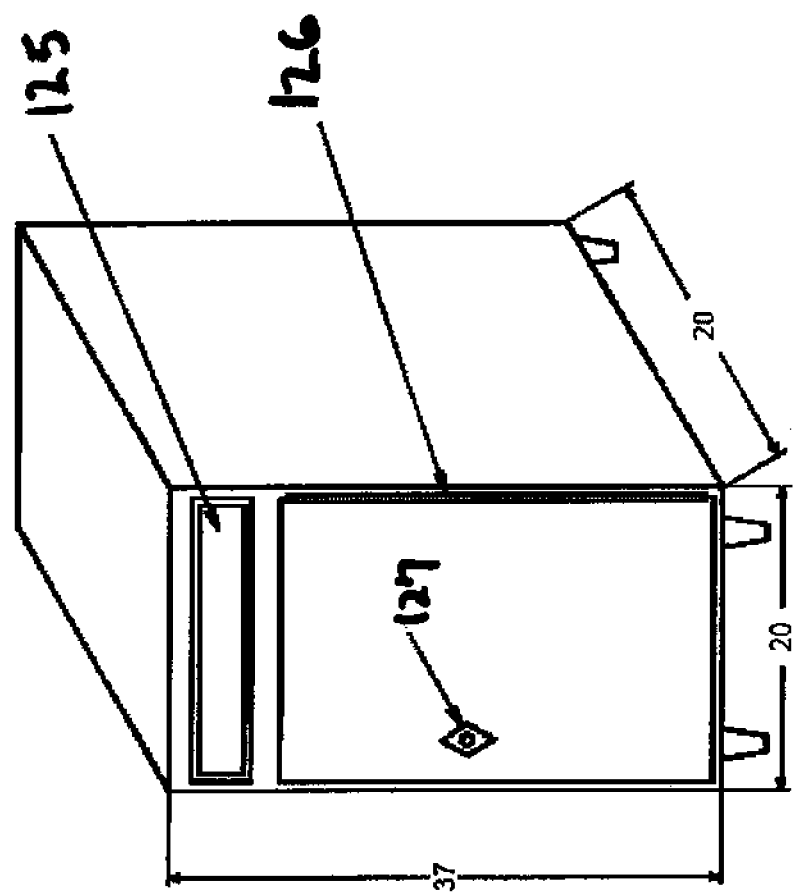
FIG. 12 shows an example of a smart and secure bottle repository.
Figure 13:
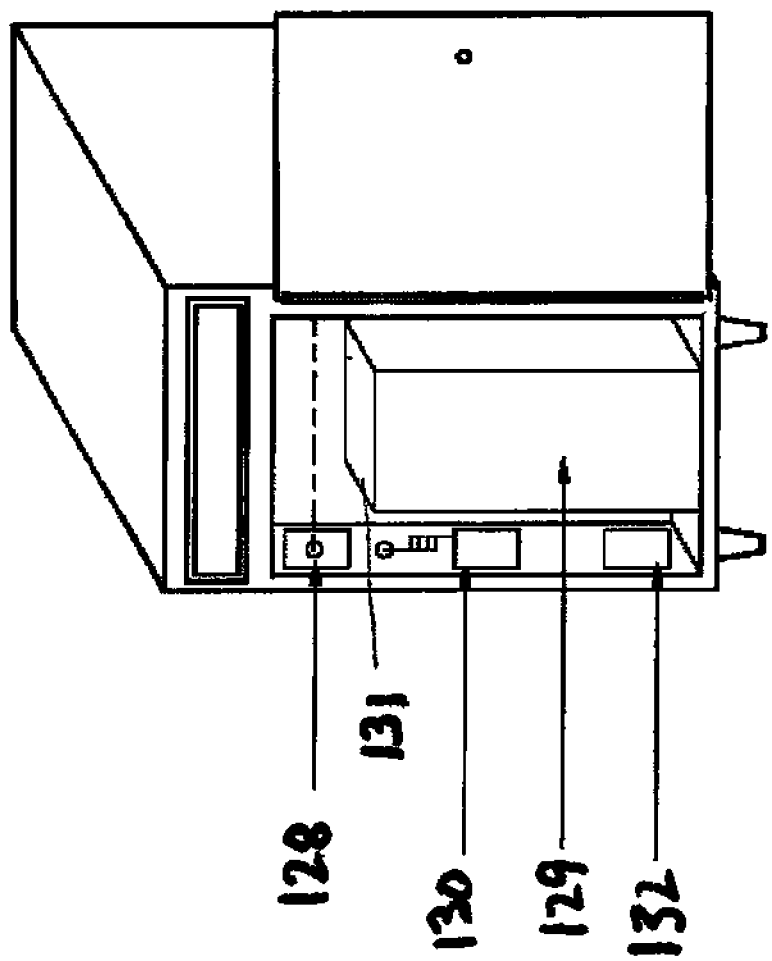
FIG. 13 shows an example of a smart and secure bottle repository.

FIGS. 12 and 13 show an example of a smart and secure package system repository which is 20" L×20" W×37" H, made of laminated ½" board with Melamine laminate, weighs: about 75 lbs and has a volume of 12 gallons which may be contained in a reusable/sealable collection bag. FIG. 12 shows a smart and secure package system repository having a hopper 125 which provides access to deposit package systems to be processed. For example, empty HDPE bottles may be deposited into the repository. A hinged door 126 is provided with a lock 127 to restrict access to the contents of the repository. FIG. 13 shows the inside of the repository which is electronically addressed at a central station, office or collection unit. The repository includes a Retro-reflective Photoelectric Sensor 128 that detects when the receptacle 129 is filled to capacity. The photoelectric sensor is triggered when the capacity of the collection bag is reached. The repository further comprises a wireless modem 130 which transmits a notification that the repository is filled to capacity. This notification via a wireless modem and cellular communication technology to the central station, home office or collection unit indicates the need to empty the repository. The receptacle may be lines with a 12 gallon reusable bag 131 and is provided with a power supply 132—120/240 AC, 50/60 Hz.

Example 26

A system may be provided which contains individual components arranged to efficiently identify information from items, record such information and destroy the items. The recorded information may include confirmation of the destruction of the items.

A conveyance may be provided, such as a conveyor belt, which is encased within a shroud. One end of the conveyance contains access to the inside of the shroud via a portal. The other end of the conveyance includes a destruction device. There may be within the shroud one or more readers which can identify information from data carriers on items introduced onto the conveyance. As the item moves through the shrouded conveyance, the information is captured by the readers and recorded. Upon delivery of the items on the conveyance to the end whereby they are transported to the destruction device, a sensor may detect their absence or removal from the conveyance or the presence of waste material in a waste container after such material emerges from the destruction device. Recorded information may include an indication that the item has been destroyed.

In some embodiments, the system comprising the components are provided in a vehicle such that the vehicle may travel to locations to pick up items and process them upon pickup within the vehicle.

In some embodiments, the components are provided at a location where items are delivered by vehicles that have picked up and transported the items to the location for processing.

Example 27

A system may be provided which contains individual components are provided in more than one location whereby items are scanned to identify and record information from items in one location and the items may be transported and destroyed at another location.

Within a vehicle a conveyance may be provided, such as a conveyor belt, which is encased within a shroud. One end of the conveyance contains access to the inside of the shroud via a portal. The other end of the conveyance includes a receptacle. There may be within the shroud one or more readers which can identify information from data carriers on items introduced onto the conveyance. As the item moves through the shrouded conveyance, the information is captured by the readers and recorded. Upon delivery of the items on the conveyance to the end whereby they are transported to the receptacle, a sensor may be provided detect their absence or removal from the conveyance or the deposition or presence of the item in the receptacle. The receptacle may then be transported to the location which contains a destruction component.

The invention claimed is:

1. A system for tracking the status and destroying a pharmaceutical product container, wherein said pharmaceutical product container comprises one or more data carriers affixed to said pharmaceutical product container, said one or more data carriers selected from the group consisting of: a radio frequency identification tag, a linear bar code, and a two-dimensional bar code; said system comprising:
   a) a controlled access portal for receiving said pharmaceutical product container;
   b) an interrogation zone comprising
      i) one or more readers for obtaining identification information from the one or more data carriers affixed to said pharmaceutical product container, said one or more readers being selected from the group consisting of: a radio frequency identification reader, and an optical recognition scanner; and
      ii) components for physically moving the pharmaceutical product container that is contained within the interrogation zone so that the one or more data carriers comes into sufficient proximity to the one or more readers to acquire the identification data from the one or more data carriers;
   c) one or more destruction devices;
   d) a transporter for advancing said pharmaceutical product container from said interrogation zone to said one or more destruction devices;
   e) a controller operatively coupled to said interrogation zone and to said transporter, and
   f) a sensor;
wherein:
   said controlled access portal is maintained in a closed/no access position after the pharmaceutical product container is placed in said controlled access portal until the pharmaceutical product container is advanced from said interrogation zone to said one or more destruction devices by said transporter;
   said components for physically moving the pharmaceutical product container that is contained within the interrogation zone are configured to be deactivated after the one or more readers acquire the identification data from the one or more data carriers and before the pharmaceutical product container is advanced from said interrogation zone to said one or more destruction devices by said transporter;
   said controller is configured to receive said identification information from said interrogation zone and to record the status of said pharmaceutical product container after said pharmaceutical product container is advanced from said interrogation zone to said one or more destruction devices by said transporter; and
   said sensor being configured to detect an action or condition selected from the group consisting of:
      said pharmaceutical product container exiting said interrogation zone,
      said interrogation zone no longer containing said pharmaceutical product container,
      said transporter advancing said pharmaceutical product container from the interrogation zone to said one or more destruction devices; and
      waste stream material exiting said one or more destruction devices.

2. The system of claim 1 wherein
   said transporter is selected from the group consisting of: a ram; a hatch; rollers; a chute; a mechanical claw; and a turntable base.

3. The system of claim 1 further comprising one or more elements selected from the group consisting of:
   a communication device that can transfer data from said controller to a receiver; and a centralized database operatively coupled to said controller.

4. The system of claim 1 comprising one or more destruction devices selected from: an incinerator; a shredder; a cutter; a crusher; a grinder; a chemical bath; a scoring tool; a laser; a mulcher; a pulverizer; and a cutting wheel.

5. A process for tracking identification information from a pharmaceutical product container, wherein said pharmaceutical product contain comprises one or more data carriers affixed to said pharmaceutical product container, said one or more data carriers selected from the group consisting of: a radio frequency identification tag, a linear bar code and a two-dimensional bar code, the process comprising the steps of:
   a) placing the pharmaceutical product container in a system according to claim 1 through the controlled access portal;
   b) maintaining the pharmaceutical product container in the interrogation zone to acquire identification information from the one or more data carriers affixed to said pharmaceutical product container using the one or more readers of the interrogation zone, wherein the pharmaceutical product container in the interrogation zone is physically moved while it is maintained within the interrogation zone by said components for physically moving the pharmaceutical product container that is contained within the interrogation zone so that the one or more data carriers affixed to said pharmaceutical product container comes into sufficient proximity to the one or more readers to acquire the identification data from the one or more data carriers, and wherein the identification information from the one or more data carriers affixed to said pharmaceutical product container is acquired;
   c) transmitting said identification information acquired from said pharmaceutical product container by the one or more readers to the controller configured to receive and maintain said identification information;
   d) advancing said pharmaceutical product container from said interrogation zone to said one or more destruction devices, by operation of the transporter, wherein said components for physically moving the pharmaceutical product container that is contained within the interrogation zone are deactivated after the one or more readers acquire the identification data from the one or more data carriers and before the pharmaceutical product container is advanced from said interrogation zone to said one or more destruction devices by said transporter; and
   e) recording status of said identification information from said pharmaceutical product container after said pharmaceutical product container is advanced from said interrogation zone by said transporter and the sensor detects
   said pharmaceutical product container exiting said interrogation zone,
   said interrogation zone no longer contains said pharmaceutical product container, or
   said transporter has operated to advance said pharmaceutical product container.

6. The process of claim 5 wherein said identification information is transmitted from said controller to a centralized database.

7. System for tracking the status and destroying a pharmaceutical product container, wherein the pharmaceutical product container comprises one or more data carriers affixed to said pharmaceutical product container, said one or more data carriers selected from the group consisting of: a radio frequency identification tag, a linear bar code and a two-dimensional bar code, the system comprising:
   a vehicle and
   a device for tracking the status and destroying pharmaceutical product containers, said device comprising:
      a portal for receiving a pharmaceutical product container;
      an interrogation zone comprising
         one or more readers for obtaining identification information from the data carrier affixed to said pharmaceutical product container, wherein said one or more readers is a radio frequency identification reader or an optical recognition scanner and
         components for physically moving the pharmaceutical product container that is contained within the interrogation zone so that the one or more data carriers comes into sufficient proximity to the one or more readers to acquire the identification data from the one or more data carriers;
      one or more destruction devices;
      a transporter for delivering said pharmaceutical product container from said interrogation zone to said controlled access receptacle and/or one or more destruction devices; and
      a controller operatively coupled to said interrogation zone and to said transporter, wherein said controller is configured to receive said identification information from said interrogation zone and configured to record the status of said pharmaceutical product container after said pharmaceutical product container is advanced from said interrogation zone by said transporter;
      wherein:
         said components for physically moving the pharmaceutical product container that is contained within the interrogation zone are configured to be deactivated after the one or more readers acquire the identification data from the one or more data carriers and before the pharmaceutical product container is advanced from said interrogation zone to said one or more destruction devices by said transporter, and
         said system can accommodate multiple pharmaceutical product containers having multiple different shapes and/or dimensions
   and wherein said vehicle contains said device.

8. The system of claim 7 wherein
said transporter is selected from the group consisting of: a ram; a hatch; rollers; a chute; a mechanical claw; and a turntable base.

9. The system of claim 7 further comprising one or more elements selected from the group consisting of:
   a communication device that can transfer data from said controller to a receiver; and
   a centralized database operatively coupled to said controller.

10. The system of claim 7 further comprising one or more destruction devices selected from the group consisting of: an incinerator; a shredder; a cutter; a crusher; a grinder; a chemical bath; a scoring tool; a laser; a mulcher; a pulverizer; and a cutting wheel.

11. A process for tracking identification information from a pharmaceutical product container and destroying the pharmaceutical product container using a system according to claim 8, the pharmaceutical product container comprising one or more data carriers affixed to said pharmaceutical product container, said one or more data carriers having identification information associated pharmaceutical product container, said one or more data carriers selected from the group consisting of: a radio frequency identification tag, a linear bar code and a two-dimensional bar code, the process comprising the steps of:

using to travel to a location, the vehicle which contains the device for tracking the status and destroying pharmaceutical product containers, the location being the location of the pharmaceutical product container;

placing a pharmaceutical product container in the device through the portal;

obtaining identification information from a said one or more data carriers affixed to said pharmaceutical product container by maintaining said pharmaceutical product container in the interrogation zone to acquire identification information from said one or more data carriers affixed to said pharmaceutical product container using the one or more readers of the interrogation zone, wherein the pharmaceutical product container in the interrogation zone is physically moved while it is maintained within the interrogation zone by said components for physically moving the pharmaceutical product container that is contained within the interrogation zone so that said one or more data carriers affixed to said pharmaceutical product container comes into sufficient proximity to said one or more readers to acquire the identification information from said one or more data carriers, and wherein the identification information from said one or more data carriers affixed to said pharmaceutical product container is acquired;

transmitting said identification information to a controller configured to receive and maintain said identification information;

advancing said pharmaceutical product container from said interrogation zone to said one or more destruction devices, by operation of the transporter; and recording the identification information and status of said pharmaceutical product container;

wherein said components for physically moving the pharmaceutical product container that is contained within the interrogation zone are deactivated after the one or more readers acquire the identification information from said one or more data carriers and before the pharmaceutical product container is advanced from said interrogation zone to said one or more destruction devices by said transporter.

12. The process of claim 11 wherein said identification information is transmitted from said controller to a centralized database.

13. A process for decommissioning identifying information associated with an empty distributed pharmaceutical product container, wherein the empty distributed pharmaceutical product container comprises one or more data carriers affixed to the empty distributed pharmaceutical product container, said one or more data carriers selected from the group consisting of: a linear bar code and a two-dimensional bar code, and the identifying information associated with the empty distributed pharmaceutical product container is logged in a remote, centralized database that lists identification information associated with multiple distributed pharmaceutical product containers, the process comprising the steps of:

obtaining the identifying information from the empty distributed pharmaceutical product container which has been identified as having identifying information to be decommissioned, wherein the identifying information is obtained using an optical recognition scanner, rendering the empty distributed pharmaceutical product container unfit for use, electronically recording data indicating that the empty distributed pharmaceutical product container which has been identified as having identifying information to be decommissioned has been rendered unfit for use, and conveying by electronic transmission information indicating that the empty distributed pharmaceutical product container bearing the identifying information is no longer in use and has been rendered unfit for use in order for the remote centralized database to be updated to reflect that the identifying information is decommissioned.

14. The process of claim 13 wherein the empty distributed pharmaceutical product container is selected from the group consisting of: an empty single dose package, an empty blister pack, an empty box, an empty bottle, an empty case, and an empty pallet.

15. The process of claim 13 wherein the empty distributed pharmaceutical product container which has been identified as having identifying information to be decommissioned is an empty distributed pharmaceutical product container collected from a pharmacy.

16. The process of claim 13 wherein the empty distributed pharmaceutical product container which has been identified as having identifying information to be decommissioned is an empty distributed pharmaceutical product container collected from a pharmacy from a collection receptacle that comprises a plurality of empty distributed pharmaceutical product containers which each have identifying information to be decommissioned.

17. The process of claim 13 wherein the empty distributed pharmaceutical product container which has been identified as having identifying information to be decommissioned is an empty distributed pharmaceutical product container collected from a pharmacy from a collection receptacle that comprises a plurality of empty distributed pharmaceutical product containers which each have identifying information to be decommissioned, wherein the plurality of empty distributed pharmaceutical product containers is transported to a different location for obtaining identifying information and rendering the empty distributed pharmaceutical product containers unfit for use.

18. The process of claim 13 wherein:

the empty distributed pharmaceutical product container is collected for destruction and decommissioning; and the empty distributed pharmaceutical product container is destroyed by the device which comprises the optical recognition scanner used to obtain the identifying information from the empty distributed pharmaceutical product container which has been identified as having identifying information to be decommissioned.

19. The method of claim 13 wherein additional information is obtained when the identifying information is obtained, and such additional information is conveyed to the database when the identifying information is conveyed to the database.

20. The system of claim 7 wherein said portal is a controlled access portal, wherein the controlled access portal is maintained in a closed/no access position after a pharmaceutical product container is placed in said controlled access portal until the pharmaceutical product container is advanced from said interrogation zone to said one or more destruction devices by said transporter.

21. The system of claim 1 wherein
said portal is a controlled access portal is a carousel.

* * * * *

UNITED STATES PATENT AND TRADEMARK OFFICE
CERTIFICATE OF CORRECTION

| | |
|---|---|
| PATENT NO. | : 8,542,099 B2 |
| APPLICATION NO. | : 12/430634 |
| DATED | : September 24, 2013 |
| INVENTOR(S) | : Thomas J. Pizzuto |

Page 1 of 1

It is certified that error appears in the above-identified patent and that said Letters Patent is hereby corrected as shown below:

In the Claims

In claim 11, column 24, line 66 reads "claim 8" and should read -- claim 7 --.

Signed and Sealed this
Twenty-ninth Day of April, 2014

Michelle K. Lee
*Deputy Director of the United States Patent and Trademark Office*